P. F. KRUG.
CHUCK.
APPLICATION FILED OCT. 23, 1907.
961,867.
Patented June 21, 1910.
2 SHEETS—SHEET 1.
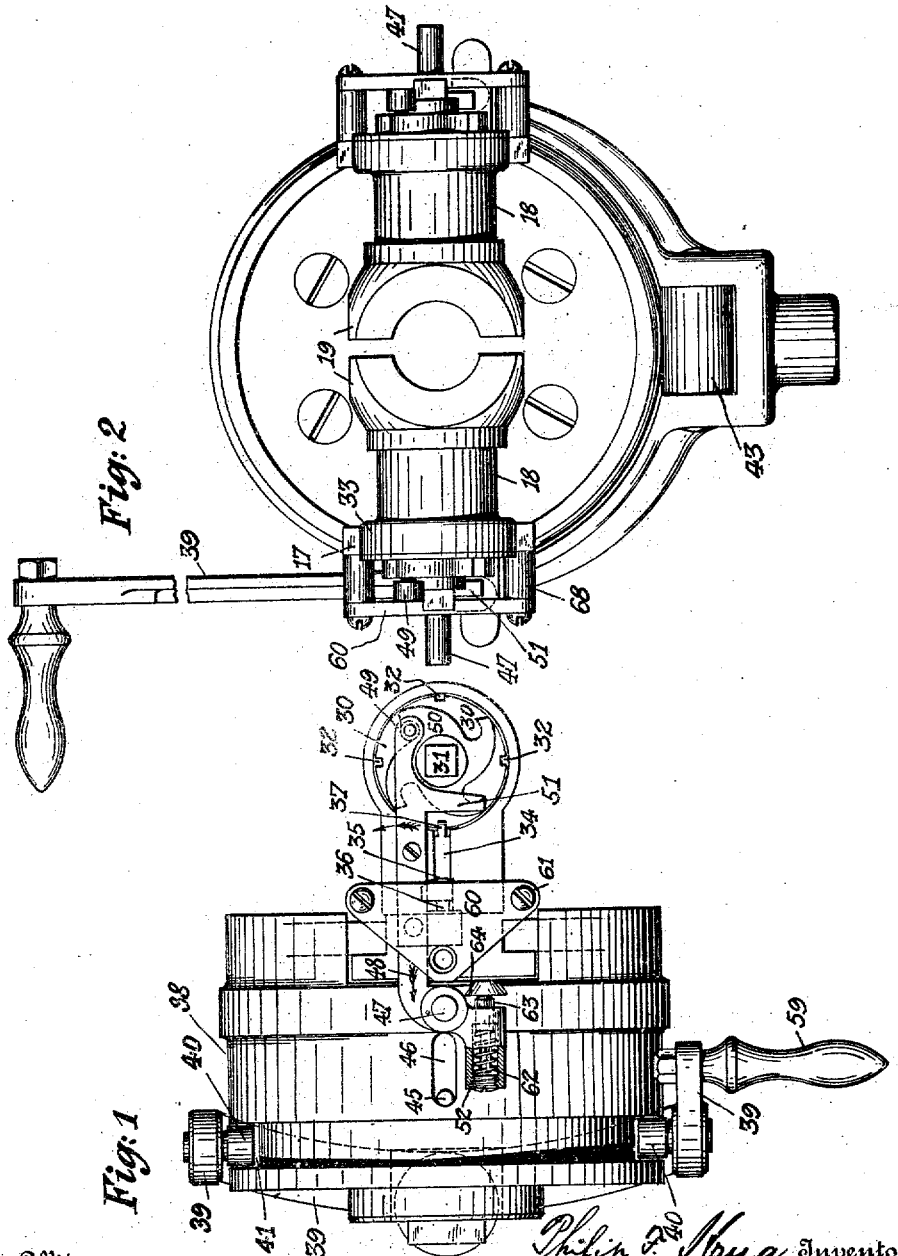
Witnesses:
V. Braun
M. A. Helmke
Philip F. Krug, Inventor
By Schreiter & Mathews,
his Attorneys

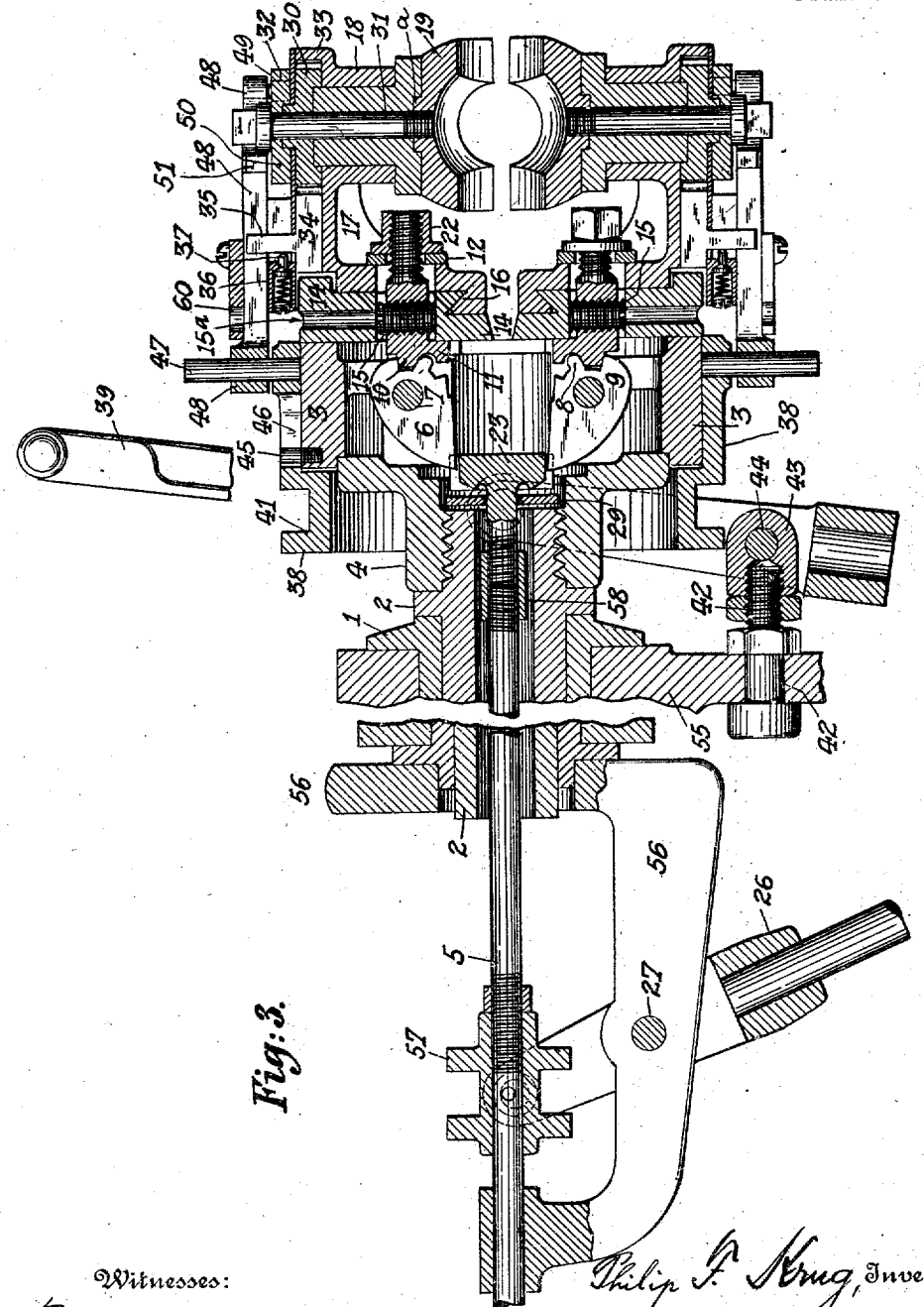

UNITED STATES PATENT OFFICE.

PHILIP F. KRUG, OF NEW YORK, N. Y., ASSIGNOR TO WALTER L. ABATE, OF NEW YORK, N. Y.

CHUCK.

961,867.  Specification of Letters Patent.  Patented June 21, 1910.

Application filed October 23, 1907. Serial No. 398,793.

*To all whom it may concern:*

Be it known that I, PHILIP F. KRUG, a citizen of the United States, and a resident of New York, county of New York, State of New York, have invented certain new and useful Improvements in Chucks, of which the following is a specification.

My invention relates to chucks and consists in devising the construction of the revolving jaws and of the means for attaching the same to a chuck and of so combining them therewith that they may be revolved and shut and opened while the lathe spindle and the chuck, fitted thereto, rotate.

In the accompanying drawing, wherein Figure 1 is a plan view, Fig. 2 a front elevation, and Fig. 3, a vertical sectional view of my improved chuck, constructed according to my invention, I have shown my improvement adapted to, and combined with, such an automatic chuck as set forth in the U. S. Letters Patent #803,604, granted to me November 7th, 1907. The improvement is, however, adaptable and capable of being used with any automatic chuck provided with mechanism for operating the jaws while the lathe spindle, to which the chuck is attached, revolves.

Referring to Fig. 3 of the drawings, 2 is the hollow spindle of the lathe, screw-threaded on its end, and to which the shank 4 of the chuck proper is secured by screwing it thereon. The casing 3 is secured to the shank 4.

14 are sliding parts of the chuck, connected thereto by cam-bolts 11 engaging with cams 6, which in turn are operated by the plunger 23, connected to the draw-rod 5 of the chuck, by the coupling 58, as shown in this figure of the drawing. The sliding parts 14 are operated by reciprocating the plunger 23, teeth 8 and 9 of the cams 6 engaging with the teeth 10 of the cam-bolts 11. The cam-bolts are bored and screw-threaded on a line with the diameter of the chuck and set screws 15 are set therein, being confined in the perforations of the sliding parts 14. The heads of set screws 15 are slotted and bores 15ª, made in the sliding parts 14, in line with the screw-threaded bores in the cam-bolts, permit a screw-driver to be set into the slots of the set screws 15 for turning them, to adjust the position of the sliding parts 14, relatively to the center of the chuck. Plunger 23, actuating the sliding parts 14, to open and close the jaws 19, is reciprocated by the lever 26. This lever is fulcrumed on pivot 27, set in bracket 56 mounted on the frame of the lathe. The end of lever 26 is bifurcated and in each of its two tines, a roller is set (revolubly on a pin) engaging in the groove of the collar 57, which is adjustably secured (screwed on) on the draw-rod 5. Lever 26 may be operated by hand or treadle, or by a pneumatic device.

In the specifications of my U. S. Letters Patent #803,604, the gripping jaws (34) are shown adjustably secured to the sliding parts (40) and the operation of the chuck is explained in detail with reference thereto. In my improved chuck, forming the subject-matter of this application for Letters Patent, brackets 17 are secured to the sliding parts 14 by screwing onto the screw-threaded ends of cam-bolts 11, the flange nuts 22 over the washers 12. To effect a more rigid connection between them, and to better resist the strain, tending to spread or break the brackets, the ends of sliding parts 14 and the adjoining parts of the brackets 17 are recessed (dove-tailed), as shown at 16, and fitted snugly together. Brackets 17 are integral with the shank-sleeves 18. The shanks *a* of the gripping jaws 19 are revolubly fitted therein, and rigidly secured together with disks 30 by bolts 31, passing through the disks and the shanks, and screwed firmly into the jaws 19. The upper parts of disk 30 are formed into ratchet wheels 50 (see Fig. 1), and rollers 49, revolubly mounted on pins set in the outer ends of pawls 48, are fitted to engage the ratchet wheels. Pawls 48, pivoted on studs 47, are provided to turn the jaws 19 when the pawls 48 are reciprocated. The pawls 48 are reciprocated by lever 39, the mechanisms being arranged as follows: Studs 47, whereon the ratchets 48 are pivoted, are set in sleeve 38, mounted to slide on casing 3 of the chuck. Sleeve 38 is slotted, as shown at 46 in Fig. 3, and pins 45 are set in the casing 3 of the chuck so as to project therefrom and engage with the slots 46 of the sleeve 38. This device limits the extent of the motion of the sleeve 38. Lever 39 is pivoted on stud 44 set in lug 43, which in turn is screwed on stud 42 fixed in bracket 55 supported on the frame of the lathe. Lever 39 is bifurcated to embrace sleeve 38, and rollers 40, rotatably mounted on studs, set in the tines of lever 39, engage in the annular groove 41 of the sleeve 38, and thus, by swinging lever 39, sleeve 38 is shifted longitudinally on the casing 3 of the chuck in the same direction, and thereby pawls 48 are reciprocated, turning ratchet wheels 50 (and the jaws 19 secured thereto) one step or one point. To guide the pawls 48 in their motions and keeping them safely in their place when the chuck rotates, the triangular plates 60 are provided. They are secured in their places by screws 61 entering into studs 68 set on brackets 17. When the lever 39 is swung to the left, sleeve 38, studs 47, set therein, and the pawls 48, pivoted thereon, are moved in the same direction, and rollers 49, traveling on the curved backs of the teeth of ratchet wheels 50, cause the pawls 48 to simultaneously swing in the direction indicated by the arrow in Fig. 1. Pawls 48 are extended rearwardly, beyond pivots 47, the extension being formed into a casing 52, wherein plungers 63 are set. Springs 62, set on the plungers, press the latter outwardly against boss 64. When pawls 48 swing, as above explained, plungers 63 are thereby pressed in against their springs 62, and this mechanism presses rollers 49 against the circumference of the ratchet wheels 50. Consequently, when the rollers 49 reach the apexes of the teeth of ratchet wheels 50, springs 62, reacting, swing pawls 48 back into their position parallel to the axis of the chuck, and rollers 49 into the recesses underneath the points of the ratchet wheels 50. This occurs simultaneously with the completing of the motion of the sleeve 38 to the left, as far as pins 45 permit. When lever 39 is then swung back again, (to the right) pawls 48 are thereby moved in the same direction, and their rollers 49, acting upon the points of ratchet wheels 50, turn the jaws 19 such a portion of a circle as corresponds to the number of the points of the ratchet wheels. The ratchet wheels 50, shown in the drawing, are provided with four points, thus at every operation of the device, the jaws are turned or rotated through an arc of 90°, this being one-fourth of a circle. The ratchet wheels 50 may have any number of points as any particular kind of work may require the jaws to be turned any part of an arc; for instance, with six points, for turning the jaws 60°; eight points, for turning them 45°, etc. Ratchet wheels with eight points could also be used for turning the jaws 90°, though, of course, it would be necessary to shift the lever 39 twice to do so.

To guard against overturning of the jaws, and to secure their exact alinement, an index mechanism is provided, constructed as follows: Notches 32, equaling in number the number of the teeth of the ratchet wheel 50, are provided in the circumference of the disk 30. Lock-bolts 34, mounted on the brackets 17, have their ends fitted into the notches 32, and spring actuated plungers 37, set in casings 36, press them against the disk 30. Studs 35, set on, or made integral with, lock-bolts 34, project to the level of the pawls 48. They stand thus in the paths of arms 51 and when the pawls 48 are drawn to the left, for the purpose of turning the jaws, as explained above, arms 51 come in contact with the studs 35, and engaging therewith, draw the bolts 34 from the notches 32, thus setting ratchet wheels 50 free to be turned. The relative positions of studs 35 and of arms 51 are so calculated, that the bolts 34 are held withdrawn from notches 32 at the start of the turning motion of ratchet wheels 50 to allow pawls 48 to move the notches 32 out of alinement with bolts 34. Then, when the bolts 34 are released, plungers 37 press them against the disks 30, until the next notches 32 come in alinement with bolts 34, when they snap in. The points of bolts 34, and the outer edges of the notches 32, are appropriately pointed or beveled, to insure a smooth working of the index.

The arrangement and the combination of the various mechanisms, enabling the turning of the jaws while the lathe spindle rotates, facilitates the use of my improved chuck for rapid working of tees and elbow pieces or fittings, and of otherwise branched or shaped pieces, and besides saving of time, insures with one adjustment only, an exact and proper setting of the work-piece relatively to the tool, for all required operations.

I claim as my invention:

The combination of a chuck head, blocks slidably mounted therein, means for adjusting the blocks relatively to each other and relatively to the center of the chuck head, mechanism for moving the blocks to and from the center of the chuck head; brackets and means for removably securing the brackets, one to each of the blocks; jaws, set revolubly, one in each of the aforesaid brackets, and means substantially as herein shown and described, for revolving each of the jaws simultaneously with the others, equidistantly, and in the same direction.

Signed at New York this 22 day of October, 1907.

PHILIP F. KRUG.

Witnesses:
JOSEPH E. CAVANAUGH,
MAX D. ORDMANN.